United States Patent
Prange

(10) Patent No.: US 7,604,429 B2
(45) Date of Patent: Oct. 20, 2009

(54) JOINT CONNECTOR FOR FIXING ASSEMBLY RAILS

(75) Inventor: Joachim Prange, Bahlingen (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/497,754

(22) PCT Filed: Nov. 27, 2002

(86) PCT No.: PCT/EP02/13337

§ 371 (c)(1),
(2), (4) Date: Jun. 4, 2004

(87) PCT Pub. No.: WO03/050422

PCT Pub. Date: Jun. 19, 2003

(65) Prior Publication Data

US 2005/0019096 A1   Jan. 27, 2005

(30) Foreign Application Priority Data

Dec. 13, 2001   (DE) ................................ 101 61 190

(51) Int. Cl.
*E04B 9/16* (2006.01)
*E04B 9/18* (2006.01)

(52) U.S. Cl. .................... 403/403; 403/232.1; 403/237; 248/58

(58) Field of Classification Search ................ 403/178, 403/217, 219, 387, 388, 403, 230, 232.1, 403/237, 385, 398, 400; 248/58, 220.41, 248/222, 51, 223.31
See application file for complete search history.

(56) References Cited

U.S. PATENT DOCUMENTS

| 1,033,414 | A | * | 7/1912 | Kahn | ......................... 403/387 |
| 1,720,104 | A | * | 7/1929 | Taylor et. al. | ............. 403/232.1 |
| 2,080,261 | A | * | 5/1937 | Funk | ....................... 248/224.8 |
| 3,005,623 | A | | 10/1961 | Kusel et al. | |
| 3,036,347 | A | * | 5/1962 | Findleton | ..................... 403/217 |
| 3,397,499 | A | * | 8/1968 | Ward | |
| 3,398,981 | A | * | 8/1968 | Vincens | ...................... 403/388 |
| 3,424,332 | A | * | 1/1969 | Pimentel | |
| 3,867,045 | A | | 2/1975 | Beals | |
| 4,226,551 | A | * | 10/1980 | Beasley | ...................... 403/219 |
| 4,396,311 | A | | 8/1983 | Gerdman | |
| 4,408,928 | A | * | 10/1983 | Steinke | ....................... 403/387 |
| 4,421,434 | A | * | 12/1983 | Magner | ...................... 403/403 |
| 4,841,708 | A | | 6/1989 | Johnston et al. | |

(Continued)

FOREIGN PATENT DOCUMENTS

DE    1 055 793    10/1959

(Continued)

*Primary Examiner*—Daniel P Stodola
*Assistant Examiner*—Ernesto Garcia
(74) *Attorney, Agent, or Firm*—Michael J. Striker

(57) ABSTRACT

A connecting node for fixing a mounting rail in abutting relationship to another mounting rail includes a connecting device having at least one holder into which the mounting rail is inserted and fixed to the other mounting rail in transverse relationship; an opening provided above the at least one holder; and an angle member having two limbs including a first limb inserted into the opening above the at least one holder and a second limb fixed to the one mounting rail inserted in the at least one holder.

3 Claims, 1 Drawing Sheet

U.S. PATENT DOCUMENTS

Figure 1:
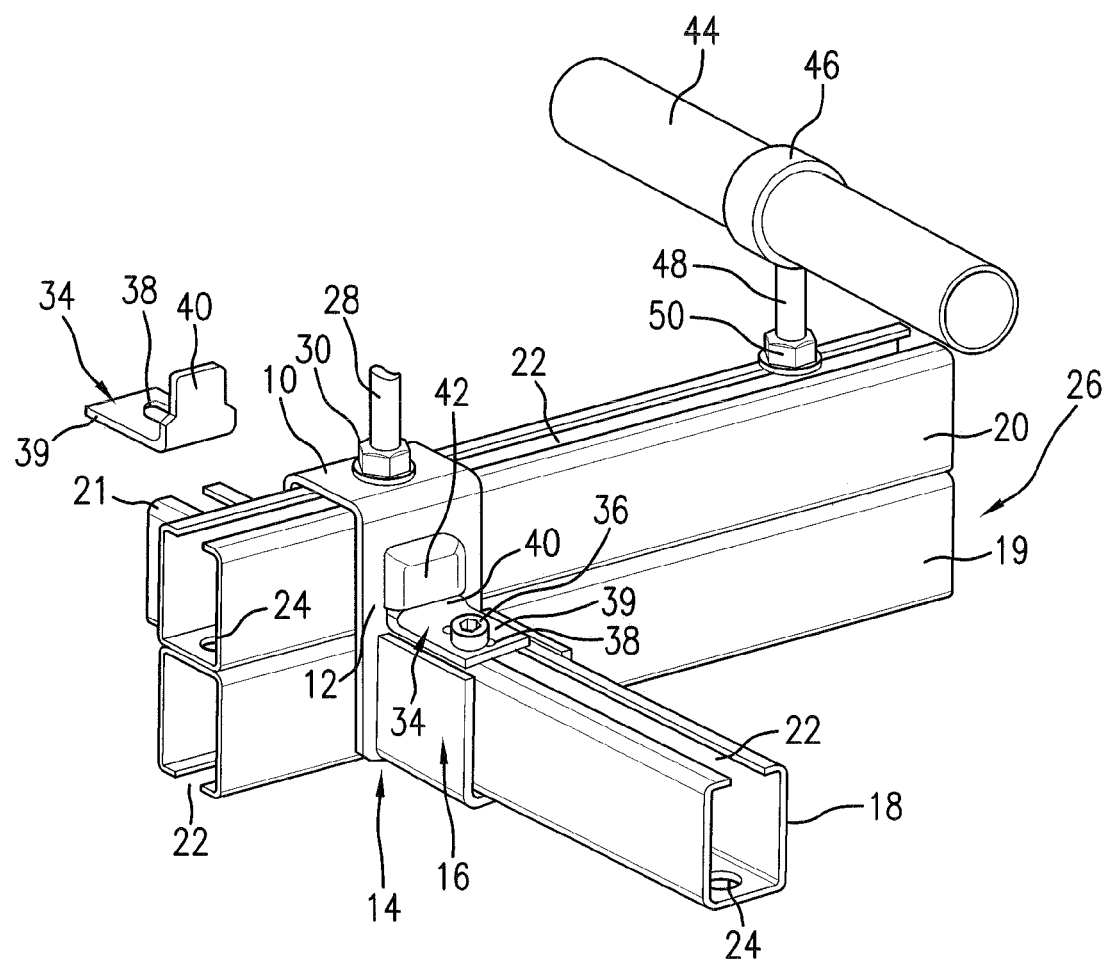

| | | | |
|---|---|---|---|
| 5,058,352 A * | 10/1991 | Loiselle et al. | |
| 5,463,973 A * | 11/1995 | Tait | 403/256 |
| D374,811 S * | 10/1996 | Miyashita | D8/382 |
| 5,873,553 A * | 2/1999 | Stahl et al. | |
| 6,112,472 A * | 9/2000 | Van Dyk et al. | 52/239 |
| 6,230,466 B1 * | 5/2001 | Pryor | 403/231 |
| 6,520,357 B1 * | 2/2003 | Kautz et al. | 248/224.51 |
| 6,719,481 B2 * | 4/2004 | Hoffmann | 403/403 |
| 6,769,750 B2 * | 8/2004 | Hughes et al. | 108/193 |
| 7,217,058 B2 * | 5/2007 | Herb | 403/237 |
| 2001/0004099 A1 * | 6/2001 | Onishi | |
| 2003/0127575 A1 * | 7/2003 | Forbis | |
| 2005/0226683 A1 * | 10/2005 | Herb | 403/230 |

FOREIGN PATENT DOCUMENTS

| | | |
|---|---|---|
| DE | 7100313 | 7/1971 |
| DE | 77 10 126 | 7/1977 |
| DE | 296 00 514 U1 | 9/1996 |
| DE | 297 04 549 U1 | 6/1997 |
| DE | 100 00 092 A | 7/2001 |
| FR | 2651842 A1 * | 3/1991 |
| GB | 1523724 A * | 9/1978 |

* cited by examiner

JOINT CONNECTOR FOR FIXING ASSEMBLY RAILS

CROSS-REFERENCE

The invention described and claimed hereinbelow is also described in German Patent Application 101 61 190.0, filed Dec. 13, 2001. This German Patent Application, whose subject matter is incorporated here by reference, provides the basis for a claim of priority of invention under 35 U.S.C. 119 (a)-(d).

BACKGROUND OF THE INVENTION

The invention relates to a connecting node for fixing a mounting rail in abutting relationship to another mounting rail.

Mounting rails are known per se. They are usually in the form of rectangular hollow profiles having a continuous longitudinal slit on one side and often a row of holes on an opposite side. The mounting rails are firmly screwed, for example, to a ceiling, parallel to and spaced from one another, so that pipes, cables or the like running transversely to the mounting rails can be fixed in a simple manner to the mounting rails, and hence to the ceiling.

A connecting node of the kind described in the preamble for fixing mounting rails is known from DE 100 00 092 A1. The connecting node comprises as connecting device U-shaped holders, into which mounting rails can be inserted and connected to other mounting rails in abutting relationship by way of a connecting device. The connecting device consists of a U-shaped member, which engages behind undercuts arranged on the holders and permits the mounting rail to be fixed in the holder by way of a screwed connection. Laying and fixing of the mounting rails with the known connecting node requires two fitters, since until the U-shaped member is secured by screws, the connecting node offers no hold for the mounting rail to be mounted on the connecting node in abutting relationship. Furthermore, a very complicated connecting device with undercuts on the holder and a U-shaped member engaging behind the undercuts is required for fixing.

SUMMARY OF THE INVENTION

The invention is based on the problem of proposing a connecting node for such mounting rails, which permits pre-mounting of the mounting rail and a simple fixing of the mounting rail which can be effected by one fitter.

The connecting node according to the invention comprises as connecting device an angled member having two limbs, wherein the one limb can be hung from an opening on the connecting node and the other limb of the angled member is fixable, for example by screwing, to the mounting rail inserted in the holder of the connecting node. Pre-fixing of the angled member to one side of the mounting rail enables one fitter to hang the latter from the connecting node by lifting the other end of the mounting rail and, by lowering it, to mount it in the U-shaped holder of the connecting node until a horizontal position on the connecting node is reached. The angled member hung from the connecting node holds the mounting rail in that position without additional support. The other end of the mounting rail forming a crossbeam is subsequently fixed to a second connecting node, which is arranged on a parallel longitudinal beam. Since the opposite end can no longer be lifted for insertion, at that end of the mounting rail prefixing of the angled member is impossible. To fix the mounting rail at that end, only the angled member is hung from the second connecting node and subsequently screwed to the mounting rail that forms the cross beam and has been placed in the U-shaped holder of the second connecting node. The connecting node according to the invention allows a time-saving mounting and fixing of mounting rails by one fitter for erection of an installation grid comprising longitudinal and cross beams, which are able to accommodate not only transverse loads but also tensile, compression and torsional forces. Installations can now be mounted on these mounting rails in so-called push-on or suspended mounting.

In one construction of the invention, the opening on the connecting node is in the form of a retaining pocket, which is formed on the connecting node for example by stamping in a stamping and bending process. The opening cross-section of the retaining pocket corresponds approximately to the cross-section of the limb of the angled member to be inserted, so that a connection secure on all sides is achieved after insertion.

To secure the angled member, the limb fixable to the mounting rail has a slot, which permits the limb to be screwed to the mounting rail.

In a preferred construction of the invention, the connecting node has two connecting devices on sides remote from one another, in order to be able to fix two mounting rails to another mounting rail in crosswise abutting relationship.

BRIEF DESCRINTION OF THE DRAWINGS

FIG. 1 shows the connecting node according to the present invention for fixing a mountin rail in abutting relation to another mounting rail.

The invention is explained in detail hereinafter with reference to an exemplary embodiment illustrated in the drawing.

DETAILED DESCRIPTION OF THE PREFERRED EMBODIMENTS

The connecting node 10 according to the invention illustrated in the FIGURE comprises a U-shaped middle portion 12, on the walls of the two limbs of which are arranged connecting devices 14. The connecting device 14 is formed by a U-shaped holder 16 projecting at right angles. In the exemplary embodiment illustrated, the holder 16 is about half the height of the connecting node 10 and is open at the top.

The connecting node 10 according to the invention is intended for connection of mounting rails 18, 19, 20, 21 arranged in crosswise abutting relationship. The mounting rails 18, 19, 20, 21 are in the form of rectangular hollow profiles provided with a continuous longitudinal slit 22 in one long wall and a row of holes 24 in an opposite long wall. In the exemplary embodiment illustrated, two of the mounting rails 19, 20 in the form of a longitudinal beam 26 are connected to one another with their long walls provided with the rows of holes 24 lying adjacent to one another. The connection can be effected, for example, by means of screws or rivets, optionally also by welding. The connection of the two mounting rails 19, 20 produces a stable longitudinal beam 26 with longitudinal slits 22 on the upper and under side.

For suspended fixing of the longitudinal beam 26 beneath a ceiling, not shown, a suspension anchor 28 fixed to the ceiling is connected to the longitudinal beam 26. For that purpose, the suspension anchor 28 is pushed through a hole in the cross wall of the connecting node 10. The suspension anchor 28 comprises a hammer head known per se at its end, which, set crosswise, engages behind the long wall of the mounting rail 20 provided with the longitudinal slit 22 laterally of the longitudinal slit 22. If the hammerhead is aligned, rotated through 90°, in the lengthwise direction of the mounting rail 20, it can be inserted and removed through the longitudinal slit 22 of the same. On the outside of the cross wall of the connecting node 10, a lock nut 30 is screwed onto the suspension anchor 28, with which the suspension anchor 28 is firmly clampable in the upper mounting rail 20 of the longitudinal beam 26. As long as the lock nut 30 is not tightened, the longitudinal beam 26 and the connecting node 10 can be displaced in the lengthwise direction of the longitudinal beam 26.

After suspended fixing of the longitudinal beam 26, individual mounting rails 18, 21 are inserted as cross beams in the U-shaped holders 16 of the connecting node 10. The cross beams are arranged at right angles to the longitudinal beams 26 abutting the same. In the Exemplary embodiment illustrated, the cross beams are arranged in a plane with the lower mounting rail 19 of the longitudinal beam 26.

To secure the cross beam in the holder 16 of the connecting node 10 according to the invention, a screw 36, which engages through a slot 38 and the longitudinal slit 22 of the mounting rail 18, fixes an angled member 34 to the cross beam in such a way that the other limb 40 of the angled member 34 projects upwards at right angles. By lifting the opposite end of the mounting rail 18, the upwardly projecting limb 40 of the angled member 34 can be placed in the downwardly open retaining pocket 42, and by lowering the mounting rail 18, can be secured. With this securing operation, the mounting rail 18 is held in a horizontal position and secured in all directions. Simultaneously with the lowering, the opposite end of the mounting rail 18 is placed in the U-shaped holder of a connecting node that is arranged on a second longitudinal beam (not shown) running parallel and spaced by the length of the cross beam. At that end, the angled member 34 is not pre-mounted on the mounting rail 18, but is introduced into the retaining pocket 42 before fixing to the mounting rail. The angled member 34 lying loose after mounting on the mounting rail is then fixed to the mounting rail by the screw 36. Once both ends of the mounting rails have been connected to the connecting nodes 10 by way of the angled members 34 secured at the ends, the longitudinal beams 26 and cross beams form a rigid frame, which is capable of accommodating not only transverse loads but also tensile, compression and torsional forces. Installations can now be carried out using the mounting rails 18, 19, 20, 21. In the exemplary embodiment, a push-on mounting is illustrated by way of a pipe 44, which is secured in a pipe clip 46. The pipe clip 46 is fixed in a manner known per se, by means of a hammerhead screw 48 in the longitudinal slit 22, to the upper side of the longitudinal beam 26 and tightly clamped with a lock nut 50. Until the lock nut 50 is tightened, the pipe 44 can be displaced in the lengthwise direction of the longitudinal beam 26. A push-on mounting (not shown) is possible in an analogous manner on the cross beam.

The invention claimed is:

1. A system comprising a first substantially horizontal mounting rail which extends in a first horizontal direction and a second substantially horizontal mounting rail which extends in a second horizontal direction transversely to said first horizontal direction; and a connecting node connecting said first mounting rail with said second mounting rail, said connecting node including a first vertically downwardly open U-shaped member at least partially surrounding said first mounting rail from above of said first mounting rail and having two side walls spaced from one another in said second horizontal direction and a connecting element which connects said side walls, and a second vertically upwardly open U-shaped member connected to said first U-shaped member, supporting said second mounting rail from below of said second mounting rail and having two side walls spaced from one another in said first horizontal direction and a connecting element which connects said side walls of said second U-shaped member with one another, a vertically downwardly open pocket attached to one of said side walls of said first vertically downwardly open U-shaped member, and an angled element having a first limb inserted upwardly in a vertical direction into said downwardly open pocket and a second limb extending substantially horizontally in said second horizontal direction and fixed to said second mounting rail between said side walls of said second vertically upwardly open U-shaped member.

2. A system of interconnecting rails as defined in claim 1, wherein said second vertically upwardly open U-shaped member is connected to said one of said side walls of said first vertically downwardly open U-shaped member.

3. A system comprising a first substantially horizontal mounting rail which extends in a first horizontal direction and a second substantially horizontal mounting rail which extends in a second horizontal direction transversely to said first horizontal direction; and a connecting node connecting said first mounting rail with said second mounting rail, said connecting node including a first vertically downwardly open U-shaped member at least partially surrounding said first mounting rail from above of said first mounting rail and having two side walls spaced from one another in said second horizontal direction and a connecting element which connects said side walls, and a second vertically upwardly open U-shaped member connected to said first U-shaped member, supporting said second mounting rail from below of said second mounting rail and having two side walls spaced from one another in said first horizontal direction and a connecting element which connects said side walls of said second U-shaped member with one another, a vertically upwardly closed and downwardly open pocket attached to one of said side walls of said first vertically downwardly open U-shaped member, and an angled element having a first limb inserted upwardly in a vertical direction into said downwardly open pocket and a second limb extending substantially horizontally in said second horizontal direction and fixed to said second mounting rail between said side walls of said second vertically upwardly open U-shaped member.

* * * * *